3,413,276
POLYTETRAFLUOROETHYLENE FINE POWDERS WITH A HIGH DEGREE OF INTERNAL STRESS
Juzaemon Hoashi, Moriguchi-shi, Osaka-fu, Akira Matsuura and Shun Koizumi, Osaka, and Norio Horiuchi, Ibaraki-shi, Osaka-fu, Japan, assignors, by mesne assignments, to Thiokol Chemical Corporation, Trenton, N.J., a corporation of Delaware
No Drawing. Filed May 25, 1964, Ser. No. 370,123
4 Claims. (Cl. 260—92.1)

ABSTRACT OF THE DISCLOSURE

Polytetrafluoroethylene fine powders, which have an average particle diameter in the range from about 0.05 to about 0.5 micron and which are produced by the coagulation of aqueous colloidal dispersions of the polymer, may be internally stressed without substantial fibrillation of the polymer particles by kneading the polytetrafluoroethylene fine powder in the presence of an organic solvent capable of wetting polytetrafluoroethylene. When the degree of stress ($S_1$) if the polytetrafluoroethylene fine powders exceeds 40, as measured by a polarizing microscope equipped with a tungsten light source, a polarizer, and an analyzer, using a photometer to determine the transmittance, there is a remarkable increase in the dielectric properties as well as improved molding properties of the "internally stressed" powder compared to the identical unstressed polytetrafluoroethylene fine powder. The degree of stress of polytetrafluoroethylene fine powders is defined by the formula $S_1=[I_1/I_2]\times 100$, where $S_1$ represents the degree of stress, $I_1$ represents the transmittance of light of a given intensity from a tungsten lamp through a standard compression-molded plate of the polytetrafluoroethylene fine powder, and $I_2$ represents the transmittance of parallel polarized light from the same light source through the standard compression-molded polytetrafluoroethylene plate.

---

This invention relates to polytetrafluoroethylene, and more particularly, to the production of polytetrafluoroethylene fine powders from aqueous colloidal dispersions of the polymer. The invention provides improved polytetrafluoroethylene fine powders having a high degree of internal stress, as well as an improved process for the production of these polytetrafluoroethylene fine powders. As used herein, the term "polytetrafluoroethylene" defines any polymer, including linear and branched homopolymers, interpolymers, block polymers and graft polymers, which contains a high proportion of the tetrafluoroethylene group ($-CF_2CF_2-$) in its molecular structure. Such polymers include polytetrafluoroethylene homopolymers, as well as copolymers of tetrafluoroethylene and other fluoroolefin comonomers, such as hexafluoropropene and trifluorochloroethylene.

The emulsion polymerization of tetrafluoroethylene, in which monomeric tetrafluoroethylene (either alone or together with other fluoroolefin comonomers) is polymerized by emulsifying the monomer or comonomers in an aqueous reaction medium containing a water-soluble radical or redox catalyst system and preferably a perfluoro- or polyfluoro-substituted emulsifying agent, yields aqueous colloidal dispersions of polytetrafluoroethylene particles having an average particle diameter from about 0.05 to about 0.5 micron which, in turn, may be coagulated to produce polytetrafluoroethylene fine powders. These polytetrafluoroethylene fine powders, which are used extensively in the production of films and thin-walled moldings, are generally free of any internal stresses.

Using polytetrafluoroethylene fine powders produced by the coagulation of aqueous colloidal dispersions having an average particle diameter in the range from about 0.05 to about 0.5 micron we have found that by kneading a polytetrafluoroethylene fine powder in the presence of an organic solvent capable of wetting polytetrafluoroethylene, it is possible to impart a relatively high degree of stress to the polytetrafluoroethylene particles with only a slight fibrillation of the particles. The degree of stress of polytetrafluoroethylene fine powders is defined by the formula $S_1=[I_1/I_2]\times 100$, where $S_1$ represents the degree of stress, $I_1$ represents the transmittance of light from a tungsten lamp of a given intensity through a standard compression-molded plate of the polytetrafluoroethylene fine powder, and $I_2$ represents the transmittance of parallel polarized light from the same light source through the standard compression-molded polytetrafluoroethylene plate. When the degree of stress of the fine powder exceeds 40, we have found that there is a remarkable increase in the dielectric properties as well as improved molding properties of this "internally stressed" powder compared to unstressed polytetrafluoroethylene fine powders.

Based on these discoveries, the invention contemplates the improvement in a process for producing polytetrafluoroethylene fine powders, in which monomeric tetrafluoroethylene is emulsion polymerized to form an aqueous colloidal dispersion of polytetrafluoroethylene having an average particle diameter in the range from about 0.05 to about 0.5 micron and the colloidal dispersion is coagulated to produce polytetrafluoroethylene fine powder, which comprises kneading the polytetrofluoroethylene fine powder in the presence of an organic solvent capable of wetting polytetrafluoroethylene until the degre of stress of the fine powder exceeds 40 while avoiding substantial fibrillation of the polymer particles, the degree of stress being defined by the formula $S_1=[I_1/I_2]\times 100$, where $S_1$ represents the degree of stress, $I_1$ represents the transmittance of light from a tungsten lamp of a given intensity through a standard compression-molded plate of the polytetrafluoroethylene fine powder, and $I_2$ represents the transmittance of polarized light from the same light source through the standard compression-molded polytetrafluoroethylene plate.

Under a polarizing microscope, the appearance of the internally-stressed polytetrafluoroethylene fine powders produced in accordance with the invention is clearly different from the appearance of unstressed conventional polytetrafluoroethylene fine powders observed under identical conditions. By way of illustration, when samples of both the internally stressed and the unstressed polytetratrifluoroetrylene fine powders are permeated with polychlorotrifluoroethylene oil and then observed under polarized light at 40× magnification, most of the particles of the internally stressed powders exhibit a characteristic brilliant appearance while the unstressed powders appear brilliant only at the fringes of the polymer particles.

The degree of stress of the standard compression-molded polytetrafluoroethylene plate is measured with a photometer equipped with a tungsten lamp source, a polarizer, and an analyzer. The standard polytetrafluoroethylene plate is prepared by compression-molding 1 gram of the polytetrafluoroethylene fine powder, all of which has been screened through a standard sieve of 20 mesh (Tyler standard), under a pressure of 30 kilograms per square centimeter in a mold having the dimensions 18 x 96 millimeters. The compression-molded plate is then permeated with a polychlorotrifluoroethylene oil, inserted between deck glasses which are placed between the polarizer and analyzer and the transmittance is then measured with closed polarizing as well as with parallel polarizing light. The degree of stress is computed from the formula $S_i = [I_1/I_2] \times 100$ where $S_i$ represents the degree of stress, $I_1$ represents the transmittance of closed polarizing light of given intensity through the standard compression-molded plate of the polytetrafluoroethylene fine powder, and $I_2$ represents the transmittance of parallel polarizing light from the same tungsten lamp source through the standard compression-molded polytetrafluoroetrylene plate.

Selection of a suitable organic solvent for wetting polytetrafluoroethylene, in the presence of which organic solvent the unstressed polytetrafluoroethylene is kneaded until its degree of stress exceeds 40, may be made from any compound which possesses a strong affinity to polytetrafluoroethylene and is capable of penetrating (i.e., wetting) the powder particles. These solvents include ketones, such as acetone and methyl ethyl ketone; alcohols, such as methanol and ethanol; carboxylic acids, such as acetic acid and propionic acid; esters, such as ethyl acetate and butyl acetate; ethers, such as diethyl ether and ethylpropyl ether; hydrocarbons, such as naphtha and decane; halogenated hydrocarbons, such as trichlorotrifluoroethane; and any other solvent or solvent system capable of wetting polytetrafluoroethylene powder.

To avoid fibrillation of the polymer particles during kneading, the fine powder should be wetted by the organic solvent and kneaded while maintaining the temperature in the range from about −20° C. to about 50° C., since higher temperatures have been observed to result in fibrillation of the powder and to promote the formation of an undesirable "wave" in unsintered tape of the fine powder.

Although a wide range of solvent concentrations may be used in kneading the polytetrafluoroethylene fine powder in accordance with the invention, optimum results have been obtained using from about 0.3 to about 1.5 liters of the organic solvent per kilogram of the powder, and preferably from 0.5 to 1.2 liters per kilogram. Concentrations of solvent in excess of 1.5 liters per kilogram of polymer dilute the powder and may result in partial kneading, while concentrations less than about 0.3 liter per kilogram of polymer result in too much of the powder being retained on the 10 mesh sieve.

Polytetrafluoroethylene fine powders having a degree of stress in excess of 40 and produced in accordance with the process of the invention yield wider tapes under ram extrusion than unstressed (or untreated) powder when both products are extruded through identical dies and then calendered under identical conditions. Moreover, unsintered tapes of these internally stressed polytetrafluoroethylene fine powders possess dielectric strengths of more than 6000 volts/0.1 mm. thickness, which is generally appreciably higher than unsintered tapes produced from conventional (or unstressed) polytetrafluoroethylene fine powders. The following examples are illustrative of the ease with which polytetrafluoroethylene fine powders having a degree of stress in excess of 40 may be produced in accordance with the process of the invention:

EXAMPLE I

One and one-half liters of deionized pure water and 6.3 percent by weight of paraffin wax containing no unsaturated compounds were charged to a 4-liter stainless steel autoclave equipped with a stirrer, to which mixture was then added 0.15 percent by weight of ammonium perfluorooctoate. Oxygen was removed from the system under vacuum, and tetrafluoroethylene then was charged to the autoclave until the internal pressure was 20 atmospheres. The temperature of the reaction mixture was increased to 70° C., and a catalyst system consisting of 0.1 percent by weight of ammonium persulfate and 2 p.p.m. of iron powder was charged into the reaction mixture, while running the agitator at a speed of 120 r.p.m. The internal pressure of the autoclave was maintained constant at 20 atmospheres by adding make-up tetrafluoroethylene to the autoclave as the pressure began to drop due to polymerization of the monomeric tetrafluoroethylene. After the concentration of the polymer reached 40 percent by weight of the aqueous colloidal dispersion in the autoclave, the emulsion polymerization reaction was terminated by venting the unreacted tetrafluoroethylene. The aqueous colloidal dispersion was then removed from the autoclave before its temperature dropped below the melting point of the paraffin wax, and allowed to stand until a wax layer solidified upon cooling. After removal of the wax layer, the resultant colloidal dispersion was coagulated while stirring, and the coagulum (polytetrafluoroethylene particles) dried at 120° C. Under electron microscope magnifications of 4000×, the powder was found to consist of particles having a diameter in the range from 0.2 to 0.3 micron.

Ten parts by weight of this polytetrafluoroethylene fine powder were mixed with 5 parts by weight of ethanol, and stirred for 1 hour in a kneader at a speed of 20 r.p.m., adding ethanol (if necessary) to maintain the ethanol concentration. The mixture was then added to 50 parts by weight of water, lightly stirred, and the sediment washed with water and then filtered. The product, which was designated as "PTFE Powder A" was then dried at 150° C. for 10 hours.

EXAMPLE II

One hundred parts by weight of polytetrafluoroethylene fine powder, produced by the emulsion polymerization technique described in Example I, were mixed with 50 parts by weight of methyl ethyl ketone and stirred for 40 minutes in a kneader operated at a speed of 50 r.p.m. The mixture was then added to 500 parts by weight of water, lightly stirred, washed with water and filtered. The resultant powder, which was designated as "PTFE Powder B," was dried at 120° C. for 20 hours.

To test the effect of kneading unstressed polytetrafluoroethylene fine powder in an organic solvent containing water, the example was reproduced under identical conditions, except that the methyl ethyl ketone employed contained 20 parts by weight of water. The resultant powder, which was designated as "PTFE Powder C," was dried at 120° C. for 20 hours.

EXAMPLE III

Conventional (unstressed) polytetrafluoroethylene fine powder and each of the polytetrafluoroethylene fine powders produced in Example I and II (PTFE Powders A, B and C) were separately calendered into tapes using a ram extruder having a die 15 mm. land length and 5 mm. internal diameter, the cylinder of the ram extruder having a 30 mm. internal diameter. One hundred parts by weight of the sample powder and 26 parts by weight of liquid paraffin were thoroughly mixed, charged into a cylinder, preformed under a pressure of 100 kilograms per square centimeter for 3 minutes, heated at 50° C. for 10 minutes, and then ram extruded at a speed of 17 millimeters per minute. The extruded product was passed between two rolls of 6 inches kept at 50° C., rotating at a speed of 5 r.p.m. The distance between the rolls was adjusted to 3, 1.5, 1.0, 0.5, 0.3, 0.2 and finally to 0.1 millimeter, and the product successively passed through the rolls each time the distance was narrowed. The final width of the tape of each sample, all of which possessed a thickness of 0.1 millimeter, was measured and recorded as its "tape width." The dielectric strength, in volts per 0.1 millimeter thickness, was determined for each sample, using the test designated for "tetrafluoroethylene resin tapes" in JIS-K-6887. The degree of stress of each sample was computed for each sample, using the technique previously described. The results of these tests are summarized in Table I below:

TABLE I.—PROPERTIES OF TAPES PREPARED FROM INTERNALLY STRESSED AND FROM UNSTRESSED POLYTETRAFLUOROETHYLENE FINE POWDERS

| Product | Tape width (mm.) | Dielectric strength (volt/0.1 mm.) | Degree of stress |
|---|---|---|---|
| Conventional PTFE Powder | 42 | 4,000 | 35 |
| PTFE Powder A | 55 | 7,000 | 60 |
| PTFE Powder B | 52 | 9,000 | 72 |
| PTFE Powder C | 48 | 6,500 | |

As shown in Table I, kneading the polytetrafluoroethylene fine powder in the presence of an organic solvent capable of wetting polytetrafluoroethylene increased the degree of stress of the polymer particles, which resulted in a decrease of the ability of the product to slide in the direction of roll rotation upon calendering. Moreover, the anisotropism of the resultant tapes was lower with respect to both their length and width, while the width of the tape and its dielectric strength were increased. Interestingly, when polytetrafluoroethylene fine powders having a degree of stress in excess of 40 and produced in accordance with the invention are compression molded, less cracks appear than with conventional (unkneaded and unstressed) polytetrafluoroethylene fine powders, probably because the attraction for micelles is sufficiently strong because of the high internal energy level to resist the normal stresses of sintering. Electron microscope magnifications of 4000× of conventional polytetrafluoroethylene fine powders and the stressed fine powders produced in accordance with the invention reveal little difference which indicates that this technique for stressing the powder avoids agglomeration of the polymer particles, yet the differences in the degree of stress of each product may be clearly demonstrated by examination in a polarizing microscope.

We claim:
1. In a process for producing polytetrafluoroethylene fine powders, in which monomeric tetrafluoroethylene is emulsion polymerized to form an aqueous colloidal dispersion of polytetrafluoroethylene having an average particle diameter in the range from about 0.05 to about 0.5 micron and the colloidal polytetrafluoroethylene dispersion is coagulated to produce polytetrafluoroethylene fine powder, the improvement which consists essentially of kneading the polytetrafluoroethylene fine powder in the presence of an organic solvent capable of wetting polytetrafluoroethylene until the degree of stress of the fine powder exceeds 40 while avoiding agglomeration and substantial fibrillation of the polymer particles, the degree of stress being defined by the formula $S_i=[I_1/I_2]\times 100$, where $S_i$ represents the degree of stress, $I_1$ represents the transmittance of light from a tungsten lamp of a given intensity through a standard compression-molded plate of the polytetrafluoroethylene fine powder, and $I_2$ represents the transmittance of parallel polarized light from the same tungsten lamp source through the standard compression-molded polytetrafluoroethylene plate.

2. In a process for producing polytetrafluoroethylene fine powders, in which monomeric tetrafluoroethylene is emulsion polymerized to form an aqueous colloidal dispersion of polytetrafluoroethylene having an average particle diameter in the range from about 0.05 to about 0.5 micron and the colloidal polytetrafluoroethylene dispersion is coagulated to produce polytetrafluoroethylene fine powder, the improvement which consists essentially of kneading the polytetrafluoroethylene fine powder at a temperature in the range from about −20° C. to about 50° C. in the presence of an organic solvent capable of wetting polytetrafluoroethylene until the degree of stress of the fine powder exceeds 40 while avoiding agglomeration and substantial fibrillation of the polymer particles, the degree of stress being defined by the formula $S_i=[I_1/I_2]\times 100$, where $S_i$ represents the degree of stress, $I_1$ represents the transmittance of light from a tungsten lamp of a given intensity through a standard compression-molded plate of the polytetrafluoroethylene fine powder, and $I_2$ represents the transmittance of parallel polarized light from the same tungsten lamp source through the standard compression - molded polytetrafluoroethylene plate.

3. In a process for producing polytetrafluoroethylene fine powders, in which monomeric tetrafluoroethylene is emulsion polymerized to form an aqueous colloidal dispersion of polytetrafluoroethylene having an average particle diameter in the range from about 0.05 to about 0.5 microns and the colloidal polytetrafluoroethylene dispersion is coagulated to produce polytetrafluoroethylene fine powder, the improvement which consists essentially of kneading the polytetrafluoroethylene fine powder in the presence of from about 0.3 to about 1.5 liters per kilogram of polymer of an organic solvent capable of wetting polytetrafluoroethylene until the degree of stress of the fine powder exceeds 40 while avoiding agglomeration and substantial fibrillation of the polymer particles, the degree of stress being defined by the formula $S_i=[I_1/I_2]\times 100$, where $S_i$ represents the degree of stress, $I_1$ represents the transmittance of light from a tungsten lamp of a given intensity through a standard compression-molded plate of the polytetrafluoroethylene fine powder, and $I_2$ represents the transmittance of parallel polarized light from the same tungsten lamp source through the standard compression-molded polytetrafluoroethylene plate.

4. In a process for producing polytetrafluoroethylene fine powders, in which monomeric tetrafluoroethylene is emulsion polymerized to form an aqueous colloidal dispersion of polytetrafluoroethylene having an average particle diameter in the range from about 0.05 to about 0.5 micron and the colloidal polytetrafluoroethylene dispersion is coagulated to produce polytetrafluoroethylene fine powder, the improvement which consists essentially of kneading the polytetrafluoroethylene fine powder at a temperature in the range from about −20° C. to about 50° C. and in the presence of from about 0.5 to about 1.2 liters per kilogram of polymer of an organic solvent capable of wetting polytetrafluoroethylene until the degree of stress of the fine powder exceeds 40 while avoiding agglomeration and substantial fibrillation of the polymer particles, the degree of stress being defined by the formula $S_i=[I_1/I_2]\times 100$, where $S_i$ represents the degree of stress, $I_1$ represents the transmittance of light from a tungsten lamp of a given intensity through a standard compression-molded plate of the polytetrafluoroethylene fine powder, and $I_2$ represents the transmittance of parallel polarized light from the same tungsten lamp source through the standard compression - molded polytetrafluoroethylene plate.

References Cited
UNITED STATES PATENTS 3,265,679  8/1966  Black, et al. _____ 260—92.1
3,009,892  11/1961  Duddington, et al. ___ 260—92.1

JOSEPH L. SCHOFER, Primary Examiner.

J. A. DONAHUE, Assistant Examiner.